US012647054B2

(12) United States Patent  
Christe et al.

(10) Patent No.: US 12,647,054 B2  
(45) Date of Patent: Jun. 2, 2026

(54) ELECTROMECHANICAL WATCH CAPABLE OF CONTACTLESS COMMUNICATION WITH A COMMUNICATION DEVICE

(71) Applicant: ETA SA MANUFACTURE HORLOGÈRE SUISSE, Grenchen (CH)

(72) Inventors: Laurent Christe, Bienne (CH); François Klopfenstein, Delemont (CH); Joerg Berthoud, Villeret (CH)

(73) Assignee: ETA SA MANUFACTURE HORLOGÈRE SUISSE, Grenchen (CH)

( * ) Notice: Subject to any disclaimer, the term of this patent is extended or adjusted under 35 U.S.C. 154(b) by 288 days.

(21) Appl. No.: 18/527,682

(22) Filed: Dec. 4, 2023

(65) Prior Publication Data

US 2024/0204703 A1 Jun. 20, 2024

(30) Foreign Application Priority Data

Dec. 19, 2022 (EP) .................................... 22214713

(51) Int. Cl.
| | |
|---|---|
| *H02P 8/08* | (2006.01) |
| *G04C 3/14* | (2006.01) |
| *H02P 8/02* | (2006.01) |

(52) U.S. Cl.
CPC .................. *H02P 8/08* (2013.01); *G04C 3/14* (2013.01); *H02P 8/02* (2013.01)

(58) Field of Classification Search
CPC .... H02P 8/08; H02P 8/02; G04C 3/14; G04G 21/04; G04G 21/00; G04G 21/06; G04R 60/02; G04R 20/26; G04B 47/00; H04B 1/40
See application file for complete search history.

(56) References Cited

U.S. PATENT DOCUMENTS

| | | | | |
|---|---|---|---|---|
| 12,418,254 | B2 * | 9/2025 | Berthoud | H02P 1/02 |
| 2004/0042345 | A1 | 3/2004 | Kawaguchi | |
| 2022/0373976 | A1 * | 11/2022 | Besuchet | G04C 3/008 |

FOREIGN PATENT DOCUMENTS

| | | | |
|---|---|---|---|
| CH | 639 236 A3 | 11/1983 | |
| EP | 1 143 309 A1 | 10/2001 | |

OTHER PUBLICATIONS

European Search Report received in European Application No. 22 21 4713; mailed Jun. 2, 2023.

* cited by examiner

*Primary Examiner* — Edwin A. Leon  
(74) *Attorney, Agent, or Firm* — Sughrue Mion, PLLC

(57) ABSTRACT

A watch (50) including an electromechanical movement provided with a stepper motor (2) and a control circuit (20) of the motor, and configured to communicate with an external communication device (100), including an antenna formed by the coil (18) of the motor and arranged to receive an amplitude-modulated magnetic signal according to the encoded data. The communication involves the generation of electrical detection pulses supplied to the coil of the motor with a pulse frequency corresponding to an encoding frequency of the magnetic signal.

23 Claims, 5 Drawing Sheets

Fig. 1

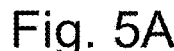
Fig. 5A
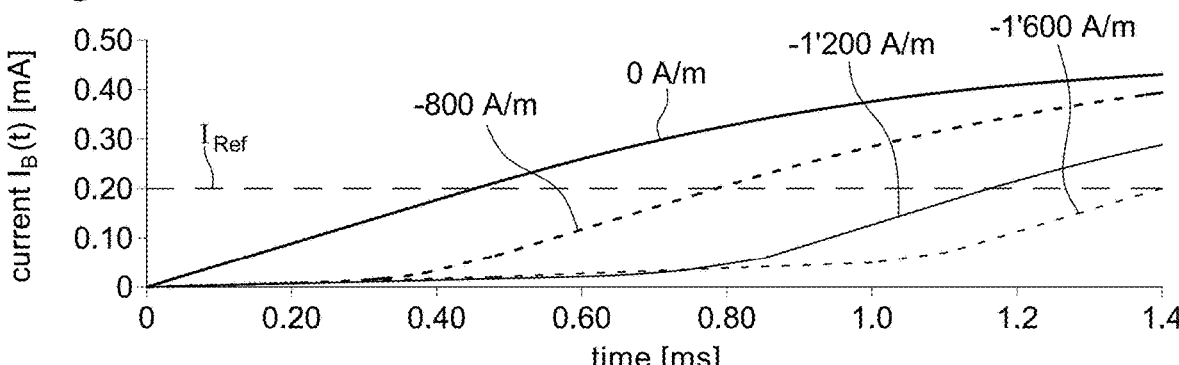
Fig. 5B
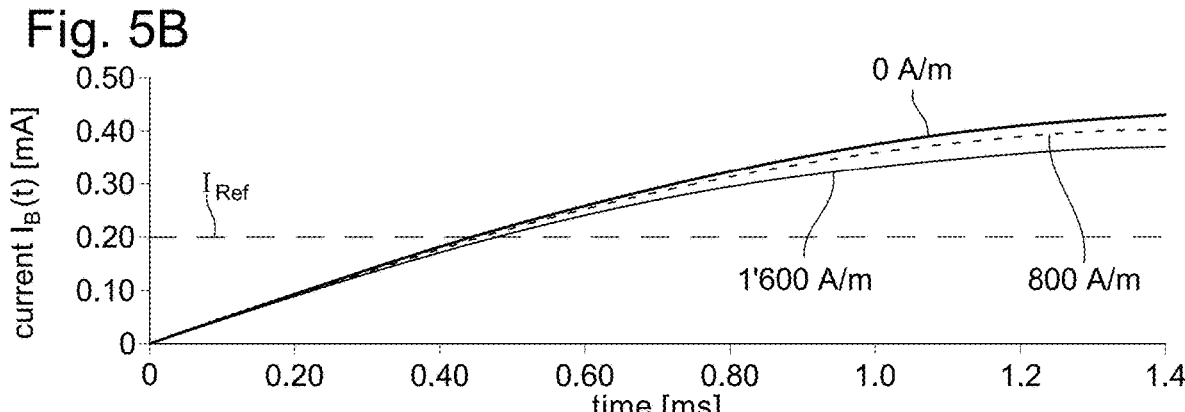
Fig. 6A
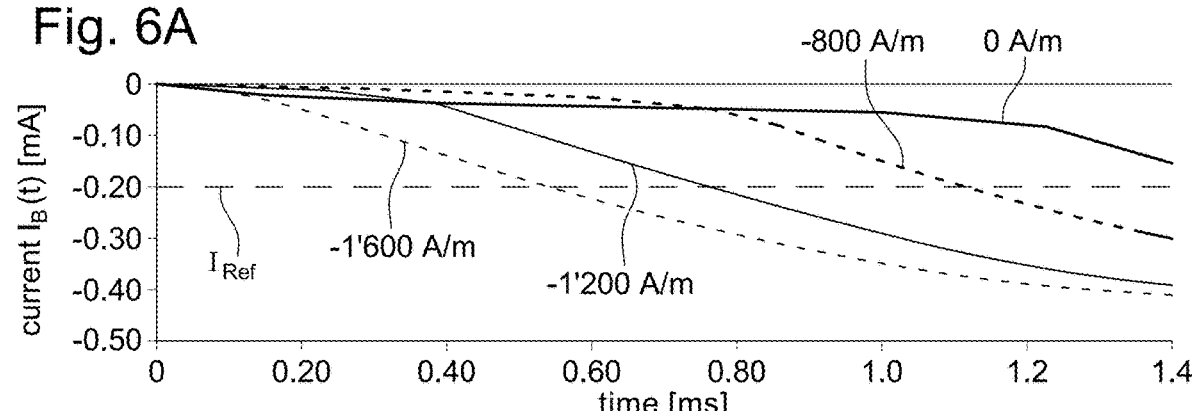
Fig. 6B
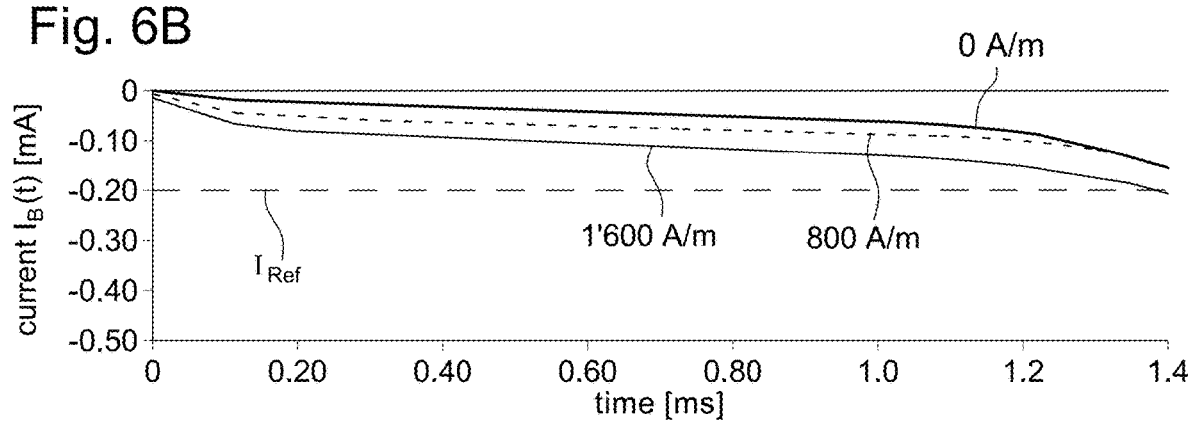

Fig. 7

| Rotor magnet rest position | External magnetic field $H_{Ext}$ | Initial flux in isthmi | Flux generated by coil in isthmi | Rise in electrical current $I_B(t)$ | | | | Rise time $T_M$ | | | |
|---|---|---|---|---|---|---|---|---|---|---|---|
| | | | | Zero/weak $F_H$ | Strong $F_H$ | Zero/weak $F_H$ | Strong $F_H$ | Zero/weak $F_H$ | Strong $F_H$ | | |
| Positive | positive sense | $+F_A +F_H$ | $+F_B(t)$ | Fast | | | | Short | | | |
| | | | $-F_B(t)$ | Slow | | | | Long | | | |
| Negative | | $-F_A +F_H$ | $+F_B(t)$ | Slow | Fast | Long | Short | | | | |
| | | | $-F_B(t)$ | Fast | Slow | Short | Long | | | | |
| Positive | negative sense | $+F_A -F_H$ | $+F_B(t)$ | Fast | Slow | Short | Long | | | | |
| | | | $-F_B(t)$ | Slow | Fast | Long | Short | | | | |
| Negative | | $-F_A -F_H$ | $+F_B(t)$ | Slow | | | | Long | | | |
| | | | $-F_B(t)$ | Fast | | | | Short | | | |

ELECTROMECHANICAL WATCH CAPABLE OF CONTACTLESS COMMUNICATION WITH A COMMUNICATION DEVICE

CROSS-REFERENCE TO RELATED APPLICATIONS

This application claims priority to European Patent Application No. 22214713.4 filed Dec. 19, 2022, the entire contents of which are incorporated herein by reference.

TECHNICAL FIELD OF THE INVENTION

The invention relates to an electromechanical watch capable of contactless communication with a communication device. The electromechanical watch comprises communication means arranged to be able to receive data from an external communication device via magnetic signals transmitted thereby, and preferably to also be able to transmit magnetic signals to this external communication device.

The invention further relates to a method for contactless communication between an electromechanical watch and a communication device external to the watch.

TECHNOLOGICAL BACKGROUND

The European patent document EP 0 635 771 describes a contactless data transmission and reception system comprising a communication device and an electromechanical watch. This document discloses using a coil forming a motor for driving a hand as a coil for transmitting and receiving magnetic signals. The watch primarily transmits a clock signal, in particular at 1 Hz, to the communication device, via the motor control circuit, in particular by driving pulses. One advantageous embodiment provides for sending a higher-frequency clock signal via the motor control circuit, which is modified for this purpose, and for providing pulses defining the transmitted clock signal, which pulses are short enough not to cause the motor's rotor to step. The motor control circuit is modified so that it can receive a magnetic signal from the communication device, between the steps performed by the rotor, this magnetic signal being amplitude-modulated. In particular, a demodulator is incorporated into the control circuit and is arranged to be able to demodulate an induced voltage signal in the coil which is generated in this coil by the magnetic signal received, and means for processing the demodulated voltage signal are further provided in the control circuit. The demodulated signal is then supplied to a specific circuit managing the transmission thereof, in particular managing transmission blocking periods, to a circuit for decoding the information contained in the demodulated voltage signal and initially in the magnetic signal. A device for demodulating analogue voltage signals has thus been added to the motor control circuit, so as to obtain corresponding digital signals which can then be decoded by a data processing logic circuit. Generally speaking, the system is designed in such a way that magnetic signals can only be received in periods between driving pulses, so as not to have to momentarily stop the hand associated with the motor from advancing. The control circuit is thus placed in a listening mode per successive selected period.

The internal communication device of the watch requires the motor control circuit to undergo significant modification, in particular by adding a demodulator for analogue induced voltage signals supplied by the coil in response to the reception of modulated magnetic signals.

SUMMARY OF THE INVENTION

The invention proposes providing a watch/timepiece equipped with a stepper motor and comprising a control circuit for this motor and means of contactless communication with an external communication device which can be relatively easily incorporated into a watch/timepiece of the conventional electromechanical type, in particular by using essentially the hardware provided in a known control circuit of a timepiece motor or by using exclusively the hardware provided in such a control circuit equipped with means for detecting an external magnetic field, such that the insertion of the communication means into the watch/timepiece involves exclusively or essentially communication software which is implemented in this watch/timepiece and which uses the hardware of the control circuit of the timepiece motor to allow for communication with the external communication device.

For this purpose, the invention relates to a timepiece as defined in general in claim 1. Embodiments or alternative embodiments are defined in the claims dependent on claim 1. It should be noted that the term "timepiece" is a general term that in particular includes watches.

The invention further provides a method of communication between the timepiece according to the invention and an external communication device.

The invention thus further relates to a communication method as defined in claim 8. Implementations or alternative implementations of the communication method are defined in the claims dependent on claim 8.

BRIEF DESCRIPTION OF THE FIGURES

The invention will be described in more detail hereinafter with reference to the accompanying drawings, given by way of examples that are in no way limiting, in which:

Figure 1:
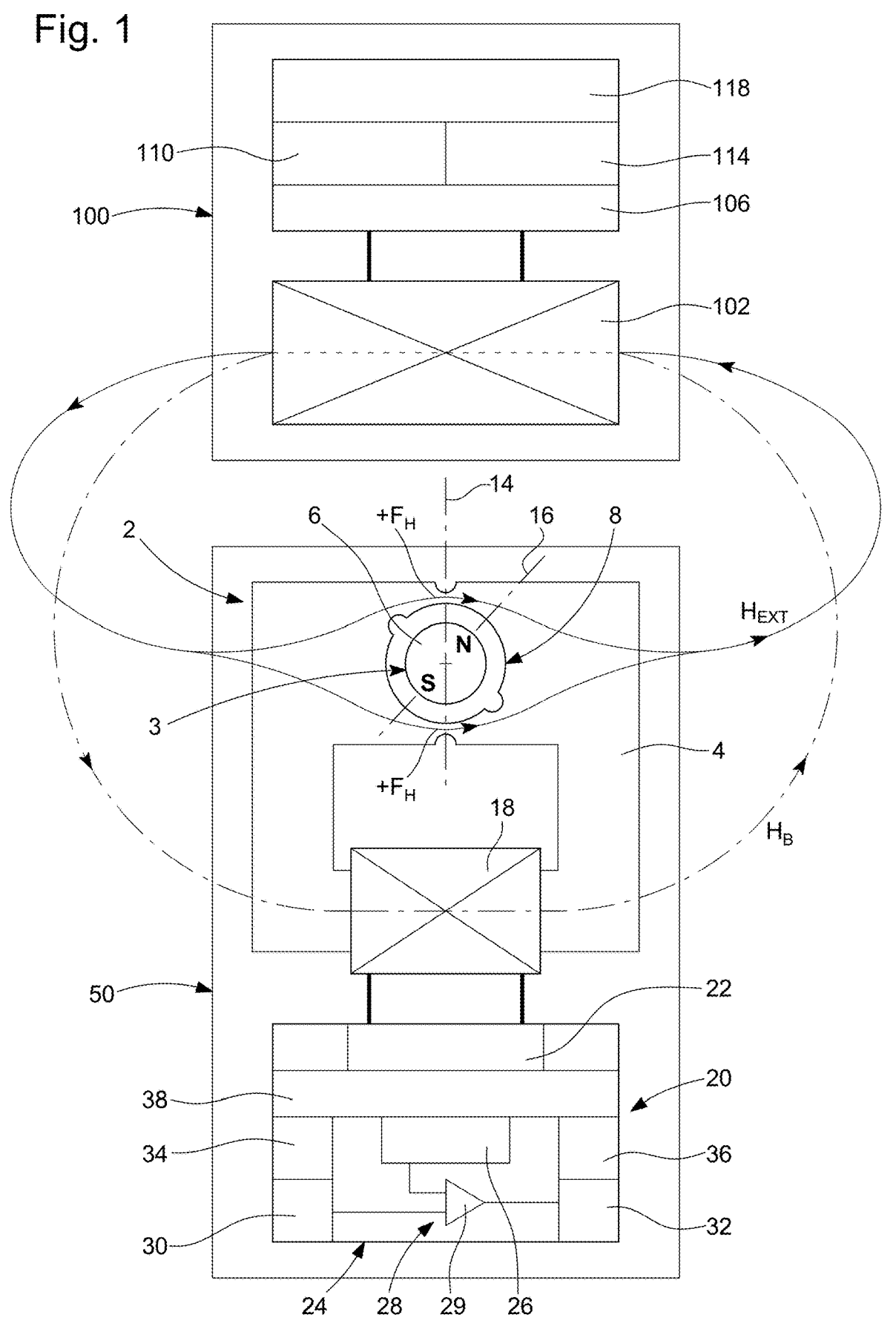

FIG. 1 diagrammatically shows a timepiece, according to a main embodiment of the invention, and an external communication device associated with this timepiece;

FIGS. 5A and 5B are two graphs showing curves representing the evolution of the electrical current in the coil, after an electrical pulse has been triggered, for the magnet of the rotor in its positive rest position and an in-phase electrical pulse (positive polarity) respectively for the two negative and positive senses of direction of an external magnetic field having a general direction according to FIG. 4, depending on various strengths of this external magnetic field;

FIGS. 6A and 6B are two graphs showing curves representing the evolution of the electrical current in the coil, after an electrical pulse has been triggered, for the magnet of the rotor in its positive rest position and an anti-phase electrical pulse (negative polarity) respectively for the two negative and positive senses of direction of a magnetic field having a general direction according to FIG. 4, depending on various strengths of this external magnetic field;

FIG. 7 is a table showing the evolution of the rise in the electrical current in the coil over time, after an electrical pulse has been triggered, in the various possible magnetic configurations at the two isthmi of the stator, for a zero or weak external magnetic field and for a relatively strong external magnetic field;

DETAILED DESCRIPTION OF THE INVENTION

With reference to the figures, a timepiece 50 according to a main embodiment of the invention will be described below, with various alternative embodiments, as well as a method for communication between this timepiece and an external communication device 100 according to a general implementation, with various specific alternative implementations.

Figure 2:
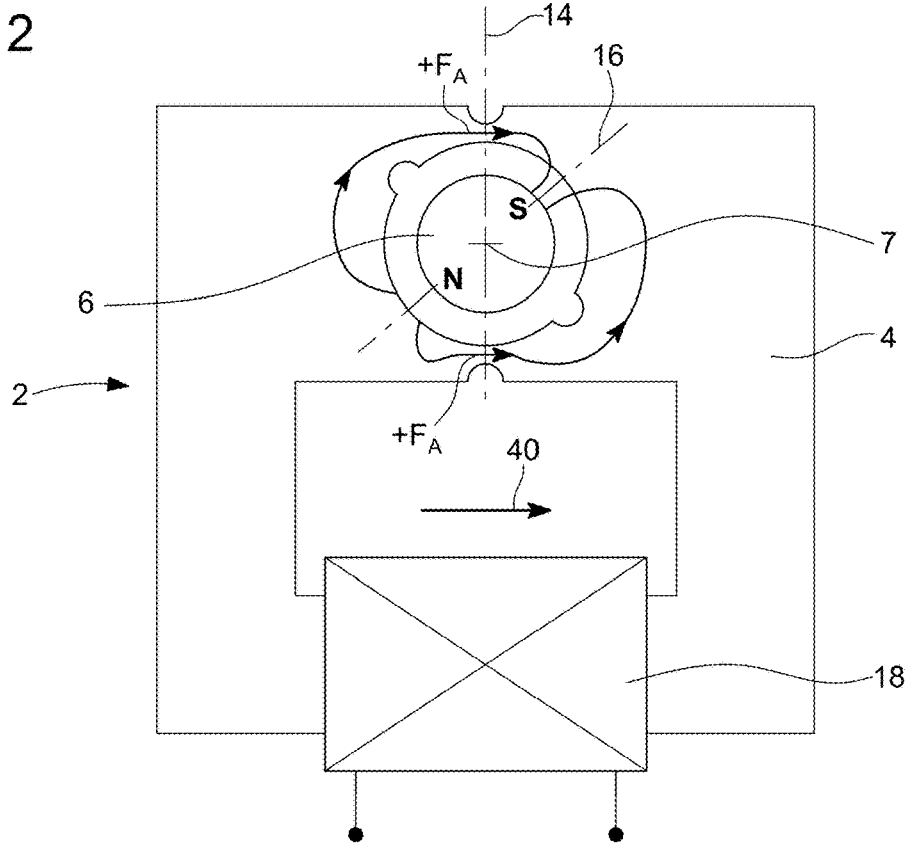
FIG. 2 is a diagrammatic view of the timepiece motor in FIG. 1, diagrammatically showing the magnetic flux of the permanent magnet of the rotor at the two isthmi of the stator.

The timepiece 50 comprises an electromechanical movement provided with a motor 2, of the stepper type, comprising a rotor 3 provided with a bipolar permanent magnet 6, having an axis of magnetisation perpendicular to the axis of rotation 7 of this rotor, and a stator 4 defining a magnetic circuit and an opening 8 which forms a housing for the permanent magnet. The stator further defines two isthmi 12a and 12b at the periphery of the opening 8, which are diametrically opposed in a first direction 14 perpendicular to the axis of rotation 7, and two stable rest positions for the rotor in which the permanent magnet 6, i.e. the axis of magnetisation thereof, is oriented in a second direction 16 respectively in both senses of direction, this second direction being angularly offset from the first direction 14. The two rest positions are conventionally determined by two diametrically opposed notches 10a and 10b provided on the edge of the opening 8. In each of its two rest positions, the permanent magnet 6 generates a first magnetic flux $F_A$ passing through the two isthmi substantially in a third direction 40, orthogonal to the first direction 14, in both senses of direction respectively. A first rest position, also referred to as a positive rest position, corresponds to a positive sense of direction of the first magnetic flux $F_A$ in the two isthmi, denoted $+F_A$ (see FIG. 2), and the second rest position, also referred to as a negative rest position, corresponds to a negative sense of direction of the first magnetic flux $F_A$ in the two isthmi, denoted $-F_A$.

Figure 3:
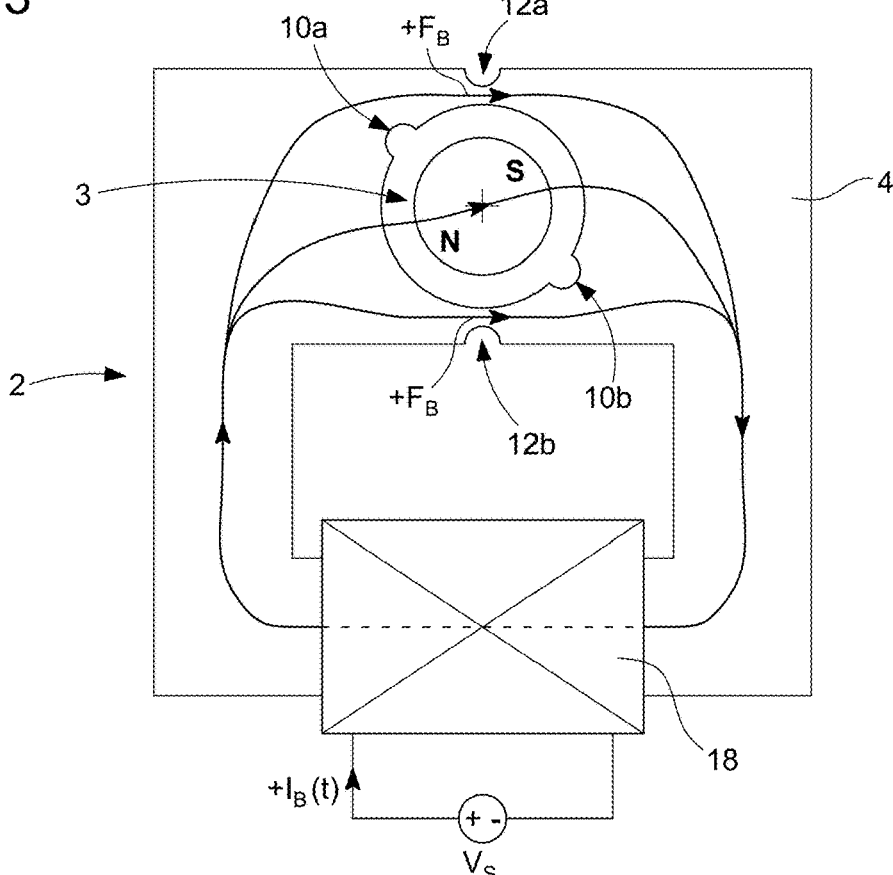
FIG. 3 is a diagrammatic view of the timepiece motor in FIG. 1, diagrammatically showing the magnetic flux generated by the coil during a positive electrical pulse.

The motor 2 further comprises a coil 18 mounted on said magnetic circuit so as to be able to generate, when supplied with a positive electrical pulse $+I_B(t)$ or with a negative electrical pulse $-I_B(t)$, a second magnetic flux $F_B$ passing through the two isthmi substantially in the third direction 40 respectively in said positive sense of direction, i.e. $+F_B$ (see FIG. 3), and said negative sense of direction, i.e. $-F_B$. It should be noted that the magnetic flux $F_B$ of the coil 18 imposes the sense of direction of the magnetic flux in the two isthmi after a certain delay has elapsed after an electrical pulse has been triggered, which quickly reaches saturation even when the magnetic flux $F_A$ of the magnet is in the opposite sense of direction to that of the coil in the two isthmi.

The timepiece 50 further comprises a control circuit 20 for the motor 2, which is arranged so that it can generate electrical driving pulses to power the coil and rotate the rotor. Generally speaking, the timepiece 50 comprises means for contactless communication with an external communication device 100, these communication means comprising an antenna formed by the coil 18 of the stepper motor 2 and being arranged so as to be able to receive, from the external communication device, data encoded in bit form in a magnetic signal 70 formed by an external magnetic field $H_{Ext}$ which is generated by this external communication device and amplitude-modulated such that a bit of value '0' corresponds to an external magnetic field of weak or zero strength, defining a low level thereof, and such that a bit of value '1' corresponds to an external magnetic field of relatively strong strength and defining a high level thereof. The communication means of the timepiece are arranged in such a way as to be able to decode the encoded data contained in the magnetic signal.

According to the invention, the communication means are arranged so as to be able to generate electrical detection pulses 82 (also referred to as 'detection pulses') which are supplied to the coil 18 with a pulse frequency corresponding substantially to an encoding frequency of the modulated magnetic signal. To this end, in the main embodiment, the communication means comprise a measurement circuit, arranged so as to be able to measure at least one parameter of each electrical detection pulse of a plurality of detection pulses generated by the communication means when receiving said encoded data, and a circuit for processing said at least one parameter measured for each detection pulse of said plurality of detection pulses. Said at least one parameter is selected and the processing circuit is arranged so as to allow the processing circuit to determine the high or low level of the external magnetic field $H_{Ext}$ during a detection pulse depending on said at least one parameter measured for this detection pulse, so as to allow the processing circuit to determine the values of the bits of the encoded data contained in said amplitude-modulated magnetic signal.

In a preferred alternative embodiment, the communication means are arranged to generate the electrical detection pulses in the coil in anti-phase relative to a rest position in which the rotor is located when these electrical detection pulses are generated. The term 'anti-phase' is understood to means that the electrical detection pulses are generated so that a resulting magnetic flux $F_B$ of the coil propagating in the stator 4 has, in the two isthmi 12a and 12b of the stator, a sense of direction that is the opposite of the sense of direction of a magnetic flux $F_A$ generated by the permanent magnet 6 of the rotor 3 in said rest position and passing through these two isthmi. This alternative embodiment has a considerable advantage in that the use of the coil 18 of the motor 2 for communication with the external communication device 100 does not risk causing the motor to step, as electrical pulses supplied to the coil in anti-phase cannot be driving pulses, as the latter are always in phase. There is thus no need to provide special conditions for the detection pulses, in particular a maximum duration which is provided so that the energy thus supplied is not enough to cause the motor 2 to advance by one step.

According to one advantageous embodiment which will be described hereinbelow, said at least one measured parameter consists of a rise time $T_M$ taken by the electrical current $I_B(t)$ in the coil 18, after the detection pulse in question is triggered, to reach a given reference current $I_{Ref}$ which is selected so as to allow the processing circuit to determine said low or high level of the external magnetic field $H_{Ext}$.

The electronic control circuit 20, associated with the motor 2 to manage in particular the driving of this stepper motor, comprises means for determining the position of the rotor at rest, from among the first and second rest positions, and an electrical pulse generator 22 associated with an electrical power source and arranged to be able to selectively supply the coil with positive electrical pulses $+I_B(t)$ and negative electrical pulses $-I_B(t)$, in particular at a voltage Vs between approximately 1 V and 3 V. The generator 22 is arranged such that it can supply electrical pulses to rotate the rotor (driving pulses) and electrical detection pulses (detection pulses) to detect an external magnetic field $H_{Ext}$, as will be explained in more detail hereinbelow. A management circuit 38 in particular manages the generation of the electrical pulses supplied to the coil. It should be noted that electrical driving pulses can also jointly form electrical detection pulses. When not associated with any other qualifier, the term 'electrical pulse' is understood herein to mean electrical detection pulses (detection pulses). The means for determining the positive or negative rest position of the rotor are known to a person skilled in the art and are typically provided in the control circuits of stepper motors for timepieces. The electronic control circuit 20 includes a memory or a register in which information on the polarity (positive or negative) of the driving pulses is stored. More specifically, such an electronic control circuit generates driving pulses which each have a specific polarity, typically alternating polarities. After a driving pulse of a specific polarity, the permanent magnet and thus the rotor are in a specific rest position, with a polarity (positive or negative) that is the opposite of the polarity of this driving pulse. The memory or the register provides information on the polarity of the last driving pulse generated or of the next driving pulse, the variant implemented being predefined and thus known. In both cases, this information can be used to determine, during normal operation of the stepper motor, the current position of the rotor from among the two rest positions of this rotor. The information on the polarity of the last or next driving pulse recorded in a memory or a register of the control circuit and a logic circuit or an algorithm for accessing this memory or register in order to be able to read the information in question, and optionally store it temporarily in the processing circuit, form means for determining the position of the rotor.

The electronic control circuit 20 further comprises a circuit 24 for detecting an external magnetic field $H_{Ext}$ associated with the management circuit 38 and formed by:

- a circuit 26 for measuring the intensity $I_B(t)$ of the electrical current flowing in the coil 18;
- a circuit 28 for comparing the intensity $I_B(t)$ of the measured electrical current with a reference current $I_{Ref}$;
- a time measurement circuit 32 for measuring a rise time $T_M$ that has elapsed between the triggering of each of the electrical detection pulses and the next moment in time when the intensity $I_B(t)$ of the electrical current flowing in the coil reaches the reference current $I_{Ref}$; and
- a circuit 36 for processing the rise time $T_M$ which is arranged to be able to determine whether the measured rise time $T_M$ reveals the presence, during the electrical detection pulse in question, of an external magnetic field $H_{Ext}$ of a certain strength, indicating a high level in the modulated magnetic signal, which passes through the isthmi 12a and 12b substantially in the third direction 40 (which results from the configuration of the isthmi which define two narrowings for the magnetic flux in the stator, which narrowings are tangential to the overall circular opening 8 of the stator) and with a specific sense of direction, or the absence of such an external magnetic field indicating a low level in said modulated magnetic signal supplied by the external communication device.

The comparison circuit 28 comprises a comparator 29 which receives, as input, after an electrical detection pulse has been triggered, the intensity $I_B(t)$ of the electrical current in the coil, which is supplied by the measurement circuit 26, and the reference current $I_{Ref}$ supplied by a memory 30, and which outputs a comparison signal $S_C$ indicating whether the intensity $I_B(t)$ is greater than the reference value $I_{Ref}$. The detection circuit 24 comprises a time base 34 which supplies a relatively high clocking signal, in particular approximately equal to or greater than 500 kHz, on the one hand to allow the intensity $I_B(t)$ of the measured electrical current to be monitored in near-real time and on the other hand to allow the measurement circuit 32 (timer 32) to accurately determine the rise time $T_M$.

Figure 4:
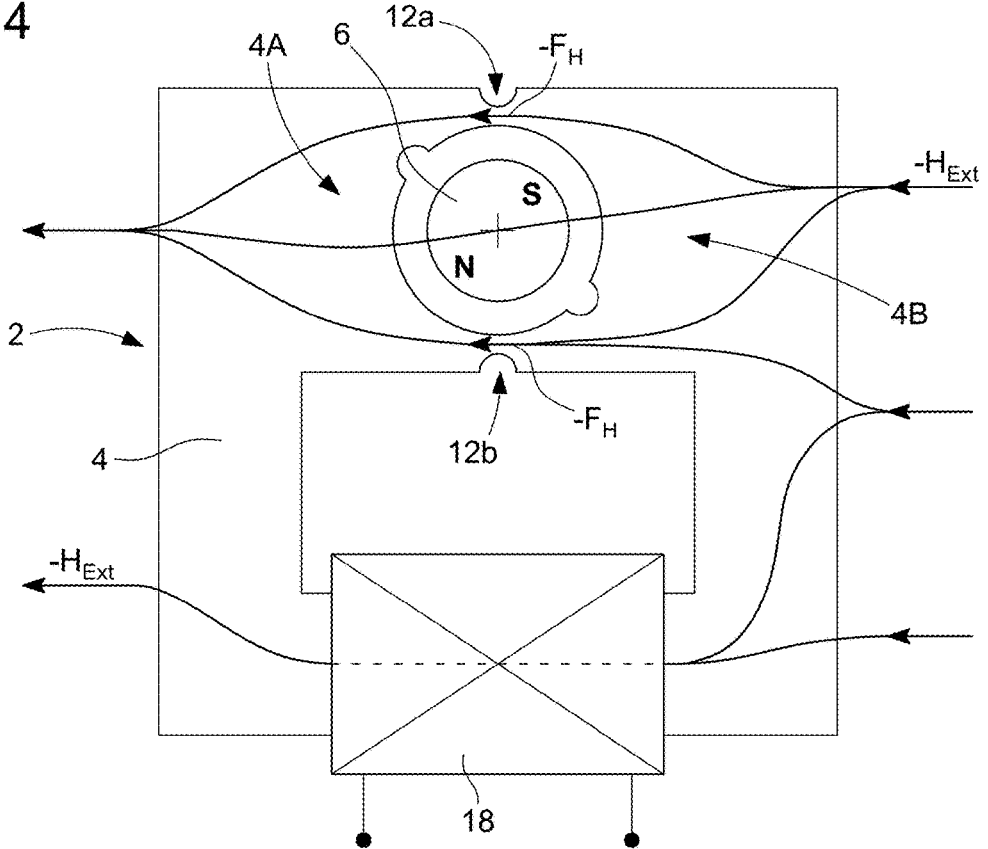
FIG. 4 is a diagrammatic view of the timepiece motor in FIG. 1, diagrammatically showing the circulation of an external magnetic field within the stator, this external magnetic field propagating in a general direction located in the plane of the stator and orthogonal to the direction of alignment of the two isthmi and in the negative sense of direction.

FIG. 4 shows an external magnetic field $H_{Ext}$, which propagates in the general plane of the stator in the direction 40, i.e. in a direction orthogonal to the direction 14 of alignment of the two isthmi 12a and 12b, in a negative sense of direction, generating a magnetic flux $-F_H$ in the two isthmi. It should be noted that it is the magnetic flux $F_H$, referred to as the 'external magnetic flux' that is important for the detection circuit 24 to detect the external magnetic field $H_{Ext}$ via a detection pulse, which magnetic flux passes within the two isthmi 12a and 12b, i.e. passes through these two isthmi between two pole parts 4A and 4B of the stator 4. The strength of the external magnetic field considered in the embodiment described here is of the order of 1,000 A/m, and less than about 2,000 A/m. However, the communication method according to the invention is not limited to external magnetic fields below this value of 2,000 A/m. Nonetheless, the external magnetic field provided for communication between the timepiece 50 and the external communication device 100 is not too strong.

The external communication device 100 comprises:
- at least one coil 102 forming a transmitting and receiving antenna,
- a switching circuit 106,
- a circuit 110 for receiving first electrical signals from the antenna 102 in response to the reception, by this antenna, of first magnetic signals transmitted by the timepiece 50, this receiving circuit being formed by an analogue-to-digital (ADC) converter,
- a generator 114 for generating second electrical signals formed by a digital-to-analogue (DAC) converter, these second electrical signals being supplied to the antenna 102 to generate second magnetic signals transmitted by the external communication device, and
- a microprocessor 118 capable of managing the reception of the first magnetic signals and the transmission of the second magnetic signals.

As disclosed in detail in the European patent application No. 22214282 (EP 20220214282), filed by the present Applicant, the contents whereof are incorporated by reference into the present description, there is a change in the evolution of the electrical current $I_B(t)$ flowing in the coil 18, after an electrical pulse supplied to this coil has been triggered, in the presence of a relatively strong external magnetic flux $F_H$ passing through the two isthmi of the stator 4 and having a sense of direction that is the opposite of that of the magnetic flux $F_A$ generated by the permanent magnet 6 of the rotor 3, thus when the external magnetic field is positive and the permanent magnet/rotor is in the negative rest position or when the external magnetic field is negative and the permanent magnet/rotor is in the positive rest position. More specifically, when the permanent magnet of the rotor is in phase with the electrical detection pulse (case corresponding to a flux $F_A$ of the magnet of the same sense of direction/sign as the magnetic flux $F_B$ generated by the coil), the intensity $I_B(t)$ of the electrical current increases quickly in the absence of any external magnetic field $H_{Ext}$ but increases slowly in the presence of an external magnetic field generating a relatively strong external magnetic flux $F_H$ of the opposite sense of direction/sign to that of the magnet of the rotor. A rise time $T_M$ for the electrical current $I_B(t)$ thus becomes long in the presence of a relatively strong external magnetic field $H_{Ext}$ under the aforementioned conditions, as the rise in the electrical current $I_B(t)$ under these conditions changes from 'fast' to 'slow'. Conversely, when the permanent magnet of the rotor is in anti-phase with the electrical detection pulse (case corresponding to a flux $F_A$ of the magnet of the opposite sense of direction/sign to that of the magnetic flux $F_B$ generated by the coil), the intensity $I_B(t)$ of the electrical current increases slowly in the absence of any external magnetic field $H_{Ext}$ but increases quickly in the presence of an external magnetic field generating a relatively strong external magnetic flux $F_H$ of the opposite sense of direction/sign to that of the magnet of the rotor. A rise time $T_M$ for the electrical current $I_B(t)$ thus becomes short in the presence of a relatively strong external magnetic field $H_{EXT}$ under the aforementioned conditions, as the rise in the electrical current $I_B(t)$ under these conditions changes from 'slow' to 'fast'. The method for detecting an external magnetic field involved in the communication method, according to a general implementation of the invention, is based on this physical phenomenon and on measuring the rise time $T_M$ knowing the rest position of the rotor (information required to supply electrical driving pulses) at the time at which an electrical detection pulse is triggered, the polarity whereof is obviously known (i.e. whether it is a positive or a negative electrical pulse, this information being given upon the generation of any electrical pulse).

FIGS. 5A and 5B show curves demonstrating the evolution of the electrical current $I_B(t)$ in the coil over time, with the permanent magnet in its positive rest position for electrical pulses in phase, i.e. positive pulses, and an external magnetic field that is respectively negative and positive for various strengths of the external magnetic field. FIG. 5A shows the physical phenomenon described hereinabove for a negative external magnetic field. The reference current $I_{Ref}$ is selected so as to allow the processing circuit to easily differentiate the rise time for various strengths of the external magnetic field, in particular so that it can differentiate between a low strength and a high strength. In the example shown in FIG. 5A, a reference current is advantageously selected between 0.15 mA and 0.25 mA. FIG. 5B shows that the electrical current in the coil undergoes almost no variation over time, and remains fast, when the external magnetic field has the same sense of direction/sign as the rest position of the permanent magnet, i.e. when the external magnetic flux $F_H$ and the magnetic flux $F_A$ of the magnet in the two isthmi have the same sense of direction, and thus the same sign. FIGS. 6A and 6B show curves demonstrating the evolution of the electrical current $I_B(t)$ in the coil over time, with the permanent magnet also in its positive rest position, but for electrical pulses in anti-phase, i.e. negative pulses, and an external magnetic field that is respectively negative and positive for various strengths of the external magnetic field. FIG. 6A shows the physical phenomenon described hereinabove. The reference current $I_{Ref}$ is selected so as to allow the processing circuit to easily differentiate the rise time for various strengths of the external magnetic field, in particular so that it can differentiate between a low strength and a high strength. In the example shown in FIG. 6A, a reference current is advantageously selected between −0.15 mA and −0.25 mA. To cover the two possible polarities of the electrical current in the coil, the absolute value of this electrical current can be compared with a positive reference current, for example 0.20 mA. FIG. 6B again shows that the electrical current $I_B(t)$ in the coil varies very little over time and remains slow, when the external magnetic field has the same sign as the rest position of the permanent magnet.

The table in FIG. 7 summarises the observations made and the specific findings in relation to the rise in the electrical current $I_B(t)$ in the coil 18 and the rise time $T_M$ to reach the reference current $I_{Ref}$ when an electrical detection pulse 82 is triggered.

An important observation is made from the disclosure hereinabove, in that, when the rotor 3/permanent magnet 6 is in the negative rest position, only an external magnetic field generating a positive external magnetic flux $F_H$ (+$F_H$), within a useful range of strength values, can be easily detected on the basis of the rise time $T_M$, and in that, when the rotor/permanent magnet is in the positive rest position, only an external magnetic field generating a negative external magnetic flux $F_H$ (−$F_H$), within a useful range of strength values, can be easily detected on the basis of the rise time $T_M$.

The present invention exploits the noteworthy disclosure given hereinabove for the method of communication, according to a general implementation of the invention, between an external communication device 100 and the timepiece 50 according to the invention, this general implementation of the communication method being described hereinbelow with reference to FIGS. 8 and 9.

Figure 8:
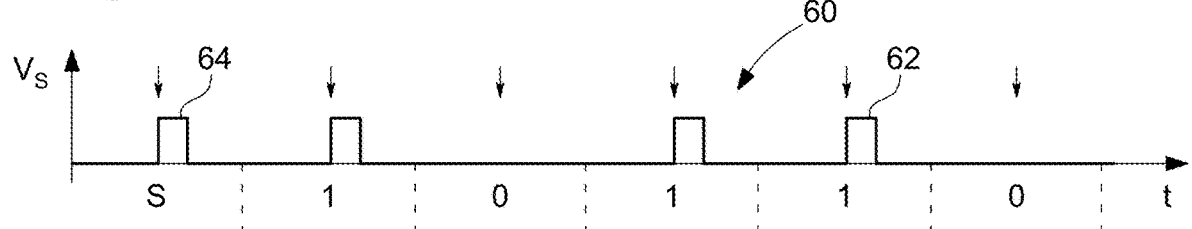
FIG. 8 shows a sequence of binary data transmitted by the timepiece in FIG. 1 via the coil of a motor which is further intended to drive an analogue display member.
Figure 9:
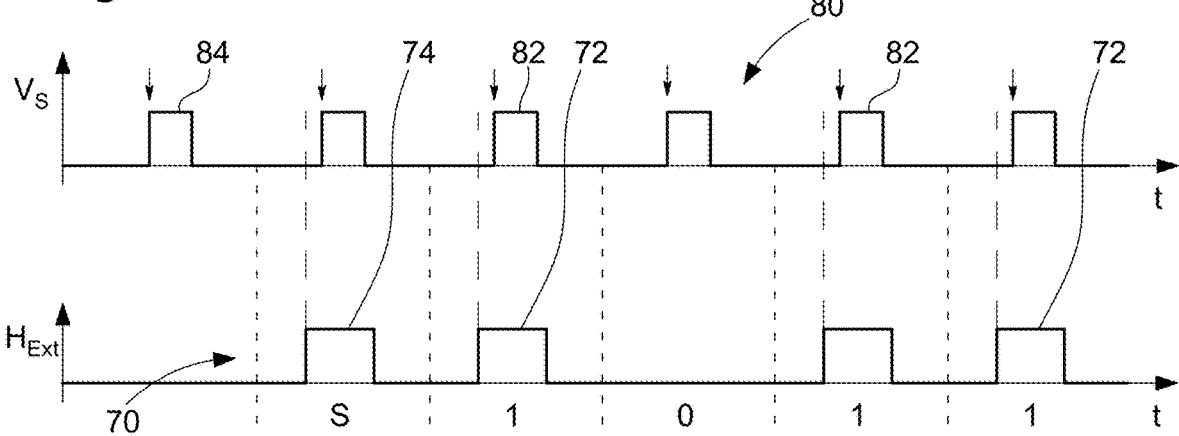
FIG. 9 shows the timepiece receiving encoded data in a modulated magnetic signal transmitted by the external communication device.

FIG. 8 shows the generation of a first magnetic signal by the timepiece 50 thus in a transmitting mode during the communication method, this first magnetic signal being intended for the external communication device 100. The first magnetic signal is generated by supplying the coil 18 of the motor 2 with a series of electrical encoding pulses 62 defining bits of value '1' in a bit sequence 60 having a first encoding frequency, the inverse whereof determines a first encoding period (indicated in FIG. 8 by vertical dashed lines). An encoding period without an electrical encoding pulse corresponds to a '0' bit in the sequence 60, whereas an electrical encoding pulse 62 occurring in an encoding period, in phase with at least one preliminary electrical pulse 64 (i.e. whose rising edge is separated in time from the rising edge of the preliminary electrical pulse 64 by an integer number of encoding periods), corresponds to a '1' bit. Thus, the communication means are arranged to allow the timepiece 50 to transmit an encoded message in bit form, for reception by the external communication device, by generating a plurality of electrical encoding pulses supplied to the coil 18, which generates a plurality of corresponding magnetic encoding pulses forming the first magnetic signal whose magnetic field $H_B$ is coupled with the coil 102, in receiving mode, of the external communication device 100. The timepiece communication means are thus arranged so as to be able to generate an electrical encoding pulse for each bit of value '1' in the encoded message, which is encoded at a first encoding frequency, and so as to not generate an electrical encoding pulse for a bit of value '0' in the encoded message.

The preliminary electrical pulse 64 is used to synchronise the timepiece 50 and the external communication device 100 for the following bit sequence 60, this device receiving a corresponding preliminary magnetic pulse generated by the preliminary electrical pulse 64 circulating in the coil 18 and for which it determines the time of a rising edge or alternatively a time value situated substantially in the middle of this preliminary magnetic pulse. In a first alternative embodiment, the device 100 stores the first encoding frequency defined by the communication protocol associated with the communication method in memory. In a second alternative embodiment, the device 100 receives a plurality of preliminary magnetic pulses at the first encoding frequency and determines the value thereof itself so that it can then correctly decode the encoded message received. When there is a single preliminary electrical pulse 64 in front of a bit sequence in the encoded message, this is typically a resynchronisation pulse which occurs after a certain time interval during which no magnetic encoding pulses are transmitted, this resynchronisation pulse further serving as the initial or start bit S for each data sequence included in the encoded message. More specifically, each data sequence is preceded by a start bit S informing the receiving device of the start of this data sequence. Such a start bit S is in particular essential when the first bit of a data sequence has the value '0' and the first magnetic signal, received by the external communication device 100, thus has no magnetic encoding pulse in the first period of this data sequence. Thus, the external communication device can detect, at a first given or detected encoding frequency, the succession of bits of said encoded message, i.e. '1' when one of the magnetic detection pulses 62 is detected, or '0' when there is no magnetic pulse in an encoding period.

The communication method according to the invention is noteworthy in that the timepiece 50 receives encoded data in a second magnetic signal which is transmitted by the external communication device. The method for the reception, by the timepiece, of the second magnetic signal transmitted by the communication device 100 is described with reference to FIG. 9. The top graph in FIG. 9 shows a periodic detection signal 80 comprising electrical detection pulses 82 generated at a specific pulse frequency and supplied to the coil 18 of the motor 2. The bottom graph in FIG. 9 diagrammatically illustrates the second magnetic signal 70, which is amplitude-modulated according to data encoded in bit form and contained in this second magnetic signal. The second magnetic signal 70 thus has magnetic encoding pulses 72 which correspond to bits of value '1' in said encoded data, the bit of value '1' preceding a data sequence being an initial or start bit S.

According to the general implementation, the communication method for the reception of the second magnetic signal by the timepiece according to the invention comprises the following steps of:

Positioning the timepiece relative to the external communication device 100 such that an external magnetic field $H_{Ext}$ emitted by this device, to form the second magnetic signal, propagates in the stator 4 of the stepper motor mainly in a direction 40 parallel to a general plane of the stator and orthogonal to a direction 14 of alignment of the two isthmi 12a and 12b of this stator;

Receiving, by the communication means of the timepiece, a signal for activating a communication mode, this activation signal being in particular provided by means for activating a communication mode with which the timepiece is equipped and which are actuated by a person or by actuation means of a device carrying this timepiece; then Generating at least one preliminary electrical pulse 84 supplied to the coil 18 of the stepper motor; and receiving, by the external communication device, at least one magnetic synchronisation pulse generated by said at least one preliminary electrical pulse circulating in the coil and thus transmitted by this coil in response to said at least one preliminary electrical pulse;

Detecting, using the external communication device, a specific time position in at least one magnetic synchronisation pulse of said at least one magnetic synchronisation pulse, in particular a rising edge or a middle time value of at least one of the magnetic synchronisation pulses; then Generating electrical detection pulses 82 supplied to the coil with a given pulse frequency and in phase with said at least one synchronisation pulse; and simultaneously transmitting the second magnetic signal 70, using the external communication device 100, the encoded data in this second magnetic signal having a second encoding frequency substantially equal to the pulse frequency and the second magnetic signal being transmitted in such a way that the high and low levels of the external magnetic field, corresponding to the '1' and '0' bits of the encoded data, are synchronised with the electrical detection pulses 82 so that each high level of the external magnetic field $H_{Ext}$, defining a magnetic encoding pulse 72 and corresponding to a '1' bit, is present in the stator 4 of the stepper motor 2 during a corresponding detection pulse 82 and so that each low level of the external magnetic field, corresponding to a '0' bit, occurs during a corresponding detection pulse 82;

Measuring, using the detection circuit 24 of the communication means of the timepiece, said at least one parameter for each of the electrical detection pulses 82 occurring during the reception of said encoded data in the second magnetic signal 70;

Processing, using the processing circuit 36 of said communication means, said at least one parameter measured for each electrical detection pulse 82 so as to determine, depending on said at least one parameter measured, whether this electrical detection pulse occurred during a high or low level of the external magnetic field and thus to determine the corresponding bit value, either '1' or '0', in the second magnetic signal 70, so as to obtain a bit sequence corresponding to the encoded data in this second magnetic signal.

According to a preferred implementation, said at least one measured parameter is a rise time $T_M$ taken by the electrical current $I_B(t)$ in the coil 18, after the electrical detection pulse 82 in question has been triggered, to reach a given reference current $I_{Ref}$. The communication method then comprises, when the timepiece 50 is in receiving mode for receiving the second magnetic signal 70, the following steps of:

Selecting a rest position, from among the positive rest position and the negative rest position, to be occupied by the rotor 3 of the stepper motor 2 when the electrical detection pulses 82 are generated, and a sense of direction, from among a positive sense of direction and a negative sense of direction, for the external magnetic field $H_{Ext}$ when the second magnetic signal 70 containing the encoded data is transmitted, so that the external magnetic field $H_{Ext}$ has a negative sense of direction and the rotor is in the positive rest position or so that the external magnetic field has a positive sense of direction and the rotor is in the negative rest position;

If the polarity of an electrical detection pulse 82 is in phase with the rest position of the rotor, i.e. if the magnetic flux $F_B$ generated by the coil in the two isthmi of the stator has the same sense of direction as the flux $F_A$ of the magnet in these two isthmi, determining whether the rise time $T_M$ is longer than a first reference time, and concluding that the magnetic field is at a high level and thus a '1' bit in the encoded data if this is the case, and concluding that the magnetic field is at a low level and thus a '0' bit in the encoded data if this is not the case;

If the polarity of the electrical detection pulse 82 is in anti-phase with the rest position of the rotor, i.e. if the magnetic flux $F_B$ generated by the coil in the two isthmi of the stator has the opposite sense of direction to that of the flux $F_A$ of the magnet in these two isthmi, determining whether the rise time $T_M$ is shorter than a second reference time, and concluding that the magnetic field is at a high level and thus a '1' bit in the encoded data if this is the case, and concluding that the magnetic field is at a low level and thus a '0' bit in the encoded data if this is not the case.

In an advantageous alternative embodiment, the first reference time is equal to the second reference time.

In a preferred alternative embodiment, the electrical detection pulses 82 are generated in anti-phase with the rest position of the rotor, such that these electrical detection pulses are not driving pulses. The duration thereof is typically between 1 ms and 2 ms. In an advantageous alternative embodiment, said at least one preliminary electrical pulse is generated in anti-phase with the rest position of the rotor, such that said at least one preliminary electrical pulse is not a driving pulse.

According to a first specific embodiment of the timepiece 50, this timepiece comprises a memory in which information can be recorded relating to a given rest position, from among the positive and negative rest positions, which the rotor 3 is intended to take when the timepiece receives the second magnetic signal 70 transmitted by the external communication device 100, while the timepiece is momentarily placed in a position defined relative to this external communication device such that the external magnetic field can propagate in a general plane of the stator in a general direction 40 substantially orthogonal to a direction 14 of alignment of the two isthmi of the stator 4. The communication means of the timepiece are arranged in such a way that, after a signal for activating a communication mode is received, the rotor of the stepper motor 2 is stopped or placed in said given rest position while a communication is being received, or in such a way as to manage the reception of the second magnetic signal such that the communication means determine bit values of said encoded data only when the rotor is in said given rest position.

According to a first alternative implementation of the method for communication between the timepiece 50, according to the first specific embodiment described hereinabove, and the external communication device 100, said selection step is predefined in a communication protocol and the information relating to the given rest position, from among the positive and negative rest positions, which the rotor is intended to take while the timepiece is receiving a communication from the external communication device, is recorded in the memory of the timepiece. Following the reception of the signal for activating a communication mode, the rotor of the stepper motor is stopped or placed in said given rest position at least for the communication being received by the timepiece from the external communication device, or the reception of the second magnetic signal 70 is managed such that the communication means determine bit values of said encoded data in this second magnetic signal only when the rotor 3 is in said given rest position. According to a second specific embodiment of the timepiece 50, the communication means of this timepiece are arranged so as to be able to detect, after a signal activating a communication mode is received, the sense of direction of an external magnetic field $H_{Ext}$ when it propagates in a general plane of the stator in a general direction substantially orthogonal to a direction of alignment of the two isthmi of the stator, and so as to then be able to stop or place the rotor in a rest position determined by the detected sense of direction of said external magnetic field, in order to satisfy said given condition for this sense of direction depending on the rest position of the rotor, to receive said encoded data or to manage the reception of said second magnetic signal 70 so that the communication means determine bit values of said encoded data only when the rotor is in the determined rest position.

According to a second alternative implementation of the method for communication between the timepiece 50, according to the second specific embodiment described hereinabove, and the external communication device 100, the communication means of the timepiece carry out the following steps during said selection step:

Generating at least one electrical pulse in the coil 18 while the rotor 3 is in the positive rest position or in the negative rest position;

if the polarity of the electrical pulse is in phase with the rest position of the rotor, determining whether said rise time $T_M$ for this electrical pulse is longer than the first reference time, and selecting, if this is the case, the rest position in which the rotor is located in the previous step;

if the polarity of the electrical pulse is in anti-phase with the rest position of the rotor, determining whether said rise time $T_M$ for this electrical pulse is shorter than the second reference time, and selecting, if this is the case, the rest position in which the rotor is located during the generation of said at least one electrical pulse.

According to a first alternative, if the condition of the second step or the condition of the third step is not fulfilled in the second alternative implementation, the rest position in which the rotor is not located during said generation of said at least one electrical pulse is selected.

According to a second alternative, if the condition of the second step or the condition of the third step is not fulfilled in the second alternative implementation, an electrical driving pulse is generated so as to advance the rotor by one step and thus position this rotor in the negative rest position or in the positive rest position respectively; the steps of the second alternative implementation are then repeated so as to determine whether the condition of the second step or the condition of the third step is then fulfilled, to ensure that the external communication device 100 has begun to transmit an external magnetic field that can be detected by the communication means of the timepiece, and then, if this is the case, the step of generating electrical detection pulses 82 is started.

In an advantageous alternative of the preferred implementation described hereinabove, during the step of generating at least one preliminary electrical pulse 84 in the coil 18 of the stepper motor 2, the external communication device 100 determines the positive or negative polarity of said at least one preliminary electrical pulse. In such a case, the communication protocol establishes whether said at least one preliminary electrical pulse 84 is generated in phase or anti-phase with the rest position of the rotor and whether or not the electrical detection pulses 82 are provided with the rotor in the same rest position as when said at least one preliminary electrical pulse was transmitted, such that the external communication device 100 determines, during said selection step, the sense of direction to be given to the external magnetic field of the second magnetic signal to satisfy said given condition for this sense of direction depending on the rest position of the rotor.

In a specific alternative embodiment, the communication protocol defines the second encoding frequency and the pulse frequency by assigning them the same value. These frequencies are, for example, equal to 32 Hz, 64 Hz, or optionally to 128 Hz.

In an advanced implementation, during said step of generating at least one preliminary electrical pulse 84, the communication means of the timepiece 50 generate a plurality of preliminary electrical pulses which are supplied to the coil at said pulse frequency and the external communication device 100 respectively receives a plurality of magnetic pulses generated by said plurality of preliminary electrical pulses circulating in the coil. On the basis of the reception of said plurality of magnetic pulses, the external communication device detects the pulse frequency. The external communication device 100 then selects a second encoding frequency equal to the detected pulse frequency.

In another implementation of the communication method according to the invention, during said selection step, the external communication device 100 determines whether the rotor 3 is in the positive rest position or in the negative rest position by detecting a magnetic flux of the permanent magnet 6 leaking from the timepiece.

The invention claimed is:

1. A timepiece (50) comprising an electromechanical movement provided with a stepper motor (2) and a control circuit (20) of the stepper motor, the stepper motor comprising a stator (4) defining two isthmi (12a, 12b) at a periphery of an opening (8) in the stator, a rotor (3) provided with a permanent magnet (6) located inside the opening, and a coil (18);

the control circuit (20) being arranged so as to be able to generate electrical driving pulses to supply the coil and rotate the rotor; the timepiece comprising means for contactless communication with an external communication device, the communication means comprising an antenna formed by said coil of the motor and being arranged so as to be able to receive, from the external communication device, data encoded in bit form in a magnetic signal (70) formed by an external magnetic field (HExt) generated by the external communication device and amplitude-modulated such that a bit of value '0' corresponds to an external magnetic field of weak or zero strength, defining a low level thereof, and such that a bit of value '1' corresponds to an external magnetic field of relatively strong strength and defining a high level thereof, the communication means being arranged in such a way as to be able to decode the encoded data contained in said magnetic signal;

wherein the communication means are arranged so as to be able to generate electrical detection pulses (82) supplied to the coil with a pulse frequency corresponding substantially to an encoding frequency of the magnetic signal; and wherein the communication means comprise a measurement circuit (32), arranged so as to be able to measure at least one parameter (TM) of each electrical detection pulse (82) of a plurality of electrical detection pulses generated by the communication means when receiving said encoded data in the magnetic signal, and a circuit (36) for processing said at least one parameter measured for each electrical detection pulse of said plurality of electrical detection pulses, said at least one parameter being selected and the processing circuit being arranged so as to allow the processing circuit to determine the high or low level of the external magnetic field (HExt) during an electrical detection pulse depending on said at least one parameter measured for the electrical detection pulse, so as to allow the processing circuit to determine the values of the bits of the encoded data contained in the magnetic signal.

2. The timepiece according to claim 1, wherein the communication means are arranged to generate the electrical detection pulses (82) in the coil in anti-phase relative to a rest position in which the rotor (3) is located when these electrical detection pulses are generated, which are thus generated so that a resulting magnetic flux (FB) of the coil propagating in the stator (4) has, in the two isthmi of the stator, a sense of direction that is the opposite of the sense of direction of a magnetic flux (FA) generated by the permanent magnet (6) of the rotor in said rest position and passing through these two isthmi.

3. The timepiece according to claim 1, wherein said measured parameter is a rise time (TM) taken by the electrical current (IB(t)) in the coil, after the electrical detection pulse (2) in question is triggered, to reach a given reference current (IRef) which is selected so that the processing circuit can differentiate between the low level and the high level of said external magnetic field (HExt).

4. The timepiece according to claim 3, wherein said permanent magnet (6) is bipolar and has an axis of magnetisation perpendicular to an axis of rotation (7) of the rotor, the two isthmi (12a, 12b) of the stator (4) being diametrically opposed in a first direction (14) perpendicular to the axis of rotation, the stator being arranged such that the rotor has two rest positions in which the permanent magnet is oriented in a second direction (16), angularly offset from the first direction (14), respectively in both senses of direction; the permanent magnet generating, in the two rest positions, a first magnetic flux (FA) passing through the two isthmi respectively in both senses of direction, a first rest position corresponding to a positive sense of direction and the second rest position corresponding to a negative sense of direction of the first magnetic flux; the coil (18) being mounted on the stator so as to be able to generate, when supplied with an electrical pulse having a positive or negative polarity, a second magnetic flux (FB) passing through the two isthmi respectively in said positive sense of direction or in said negative sense of direction; and wherein the control circuit comprises means for determining the position of the rotor when at rest, from among said first and second rest positions, and a circuit (24) for detecting an external magnetic field (HExt), forming the communication means, which comprise:

a measurement circuit (26) for measuring said electrical current;

a circuit (28) for comparing the measured electrical current with said reference current (IRef);

a time measurement circuit (32) arranged to measure said rise time (TM) that has elapsed between the triggering of an electrical detection pulse and the next moment in time when said electrical current (IB(t)) flowing in the coil reaches said reference current; and a circuit (36) for processing the rise time which is arranged to be able to determine whether the measured rise time indicates a high level or a low level of said external magnetic field (HExt) passing through the two isthmi with a specific sense of direction, while the rotor is in a rest position in which the first magnetic flux (FA) passing through the two isthmi has a sense of direction that is the opposite of said specific sense of direction, when an electrical detection pulse is generated with a given polarity.

5. The timepiece according to claim 3, wherein it comprises a memory in which information can be recorded relating to a given rest position, from among the first and second rest positions, which the rotor is intended to take when communication is received from the external communication device (100), while the timepiece (50) is momentarily placed in a position defined relative to the external communication device so that the external magnetic field can propagate in a general plane of the stator (4) in a general direction substantially orthogonal to a direction (14) of alignment of the two isthmi of the stator; and wherein the communication means are arranged in such a way that, after a signal for activating a communication mode is received, the rotor of the stepper motor (2) is stopped or placed in said given rest position while a communication is being received, or in such a way as to manage the reception of the magnetic signal (70) such that the communication means determine bit values of said encoded data in the magnetic signal only when the rotor is in said given rest position.

6. The timepiece according to claim 3, wherein the communication means are arranged so as to be able to detect, after a signal activating a communication mode is received, the sense of direction of the external magnetic field (HExt) when it propagates in a general plane of the stator in a general direction substantially orthogonal to a direction of alignment of the two isthmi of the stator, and so as to then be able to stop or place the rotor (3) in a rest position determined by the detected sense of direction of the external magnetic field, in order to receive said encoded data or to manage the reception of said magnetic signal (70) so that the communication means determine bit values of said encoded data only when the rotor (3) is in the determined rest position.

7. The timepiece according to claim 3, wherein the communication means are arranged to allow the timepiece (50) to transmit an encoded message in bit form, for reception by the external communication device, by generating a plurality of electrical encoding pulses (62) supplied to the coil (18), which thus emits a plurality of corresponding magnetic encoding pulses; and wherein the communication means are arranged so as to generate an electrical encoding pulse (62) for each bit of value '1' in the encoded message, which is encoded at a given encoding frequency, and so as to not generate an electrical encoding pulse for a bit of value '0' in the encoded message.

8. A method for contactless communication between a timepiece (50) and an external communication device (100), the communication method comprising, in order for the timepiece to receive encoded data in bit form in a magnetic signal (70) transmitted by the external communication device, the following steps of:

positioning the timepiece relative to the external communication device such that an external magnetic field (HExt) emitted by the device, to form the magnetic signal, propagates in the stator of the stepper motor mainly in a direction parallel to a general plane of the stator and substantially orthogonal to a direction (14) of alignment of the two isthmi (12a, 12b) of the stator;

receiving, by the communication means of the timepiece, a signal for activating a communication mode; then generating at least one preliminary electrical pulse (84) supplied to the coil (18) of the stepper motor (2); and receiving, by the external communication device (100), at least one magnetic synchronisation pulse generated by said at least one preliminary electrical pulse circulating in the coil;

detecting, using the external communication device, a specific time position in at least one magnetic synchronisation pulse of said at least one magnetic synchronisation pulse, a rising edge or a middle time value of at least one of the magnetic synchronisation pulses; then generating electrical detection pulses (82) supplied to the coil with a given pulse frequency and in phase with said at least one synchronisation pulse (84); and simultaneously transmitting the magnetic signal (70), using the external communication device, the encoded data having an encoding frequency substantially equal to the pulse frequency and the magnetic signal (70) being transmitted in such a way that the high and low levels of the external magnetic field (HExt), corresponding to the '1' and '0' bits of the encoded data, are synchronised with the electrical detection pulses (82) so that each high level of the external magnetic field, corresponding to a '1' bit, is present in the stator (4) of the stepper motor during a corresponding detection pulse and so that each low level of the external magnetic field, corresponding to a '0' bit, occurs during a corresponding detection pulse;

measuring, using the detection circuit (24) of the communication means of the timepiece (50), said at least one parameter (TM) for each of the electrical detection pulses (82) occurring during the reception of said encoded data in the magnetic signal (70);

processing, using the processing circuit (36) of said communication means, said at least one parameter measured for each electrical detection pulse (82) so as to determine, depending on said at least one parameter measured, whether the electrical detection pulse occurred during a high or low level of the external magnetic field and thus to determine the corresponding bit value, either '1' or '0', in the magnetic signal, so as to obtain a bit sequence corresponding to the encoded data in the magnetic signal.

9. The method according to claim 8, further comprising the following steps of:

selecting a rest position, from among the first and second rest positions, to be occupied by the rotor (3) of the stepper motor when the electrical detection pulses (82) are generated, and a sense of direction, from among a positive sense of direction and a negative sense of direction, for the external magnetic field when the magnetic signal (70) containing the encoded data is transmitted, so that the external magnetic field (HExt) has a negative sense of direction and the rotor is in the first rest position or so that the external magnetic field has a positive sense of direction and the rotor is in the second rest position;

if the polarity of an electrical detection pulse (82) is in phase with the rest position of the rotor, determining whether said rise time (TM) is longer than a first reference time, and concluding that the magnetic field is at a high level and thus a '1' bit in the encoded data if this is the case, and concluding that the magnetic field is at a low level and thus a '0' bit in the encoded data if this is not the case;

if the polarity of the electrical detection pulse (82) is in anti-phase with the rest position of the rotor, determining whether said rise time (TM) is shorter than a second reference time, and concluding that the magnetic field is at a high level and thus a '1' bit in the encoded data if this is the case, and concluding that the magnetic field is at a low level and thus a '0' bit in the encoded data if this is not the case.

10. The method according to claim 9, wherein the selection step is predefined in a communication protocol and the information relating to the given rest position, from among the first and second rest positions, which the rotor (3) is intended to take when communication is received from the external communication device, is recorded in the memory of the timepiece; and wherein, following the reception of the signal for activating a communication mode, the rotor of the stepper motor is stopped or placed in said given rest position at least for a communication being received from the external communication device, or the reception of the magnetic signal is managed such that the communication means determine bit values of said encoded data in said magnetic signal (70) only when the rotor is in said given rest position.

11. The method according to claim 9, wherein, during the selection step, the communication means of the timepiece carry out, after a signal for activating a communication mode has been received, the following steps of:

generating at least one electrical pulse in the coil while the rotor is in the first rest position or in the second rest position;

if the polarity of the electrical pulse is in phase with the rest position of the rotor, determining whether said rise time (TM) is longer than the first reference time, and selecting, if this is the case, the rest position in which the rotor is located in the previous step;

if the polarity of the electrical pulse is in anti-phase with the rest position of the rotor, determining whether said rise time (TM) is shorter than the second reference time, and selecting, if this is the case, the rest position in which the rotor is located during the generation of said at least one electrical pulse.

12. The method according to claim 11, wherein, if the condition of the second step or the condition of the third step is not fulfilled, the rest position in which the rotor is not located during said generation of said at least one electrical pulse is selected.

13. The method according to claim 11, wherein, if the condition of the second step or the condition of the third step is not fulfilled, an electrical driving pulse is generated so as to advance the rotor by one step and thus position the rotor in the second rest position or in the first rest position respectively; the steps then repeated so as to determine whether the condition of the second step or the condition of the third step is then fulfilled, to ensure that the external communication device has begun to transmit said magnetic signal, and then, if this is the case, the step of generating electrical detection pulses (82) is started.

14. The method according to claim 9, wherein, during the step of generating at least one preliminary electrical pulse (84) in the coil of the stepper motor, the external communication device determines the positive or negative polarity of said at least one preliminary electrical pulse; and wherein the communication protocol establishes whether said at least one preliminary electrical pulse is generated in phase or anti-phase with the rest position of the rotor and whether or not the electrical detection pulses are provided with the rotor in the same rest position as when said at least one preliminary electrical pulse was transmitted, such that the external communication device determines, during said selection step, the sense of direction to be given to the external magnetic field (HExt) of the magnetic signal (70) to satisfy the given condition for this sense of direction depending on the rest position of the rotor.

15. The method according to claim 9, wherein, during said selection step, the external communication device determines whether the rotor (3) is in the first rest position or in the second rest position by detecting a magnetic flux of the permanent magnet leaking from the timepiece.

16. The method according to claim 8, wherein the electrical detection pulses (82) are generated in anti-phase with the rest position of the rotor (3), such that these electrical detection pulses are not driving pulses.

17. The method according to claim 16, wherein said at least one preliminary electrical pulse (84) is generated in anti-phase with the rest position of the rotor (3), such that said at least one preliminary electrical pulse is not a driving pulse.

18. The method according to claim 9, wherein the electrical detection pulses (82) are generated in anti-phase with the rest position of the rotor (3), such that these electrical detection pulses are not driving pulses.

19. The method according to claim 18, wherein said at least one preliminary electrical pulse (84) is generated in anti-phase with the rest position of the rotor (3), such that said at least one preliminary electrical pulse is not a driving pulse.

20. The method according to claim 8, wherein a communication protocol defines the encoding frequency and the pulse frequency by assigning them the same value.

21. The method according to claim 8, wherein, during the step of generating at least one preliminary electrical pulse, the communication means of the timepiece generate a plurality of preliminary electrical pulses (84) supplied to the coil at said pulse frequency and the external communication device (100) respectively receives a plurality of magnetic pulses generated by said plurality of preliminary electrical pulses circulating in the coil; and wherein the external communication device detects, on the basis of the reception of the plurality of magnetic pulses, the pulse frequency, the external communication device selecting an encoding frequency that is equal to the detected pulse frequency.

22. The method according to claim 8, wherein the communication means of the timepiece can transmit an encoded message (60) in bit form, for reception by the external communication device, by generating a plurality of electrical encoding pulses (62) supplied to the coil (18), which generates a plurality of corresponding magnetic pulses; and wherein each electrical encoding pulse corresponds to a bit of value '1' in the encoded message, the external communication device detecting the succession of bits of said encoded message, either '1' when corresponding magnetic pulses are detected, or '0' in the absence of any magnetic pulse.

23. The method according to claim 9, wherein the communication means of the timepiece can transmit an encoded message (60) in bit form, for reception by the external communication device, by generating a plurality of electrical encoding pulses (62) supplied to the coil (18), which generates a plurality of corresponding magnetic pulses; and wherein each electrical encoding pulse corresponds to a bit of value '1' in the encoded message, the external communication device detecting the succession of bits of said encoded message, either '1' when corresponding magnetic pulses are detected, or '0' in the absence of any magnetic pulse.

* * * * *